US012799017B2

(12) United States Patent
Ciuperca

(10) Patent No.: US 12,799,017 B2
(45) Date of Patent: Nov. 17, 2026

(54) ROCKWOOL FIBER INSULATION MANUFACTURE USING HYALOCLASTITE AND METHOD OF MAKING AND USING SAME

(71) Applicant: Greencraft LLC, Norcross, GA (US)

(72) Inventor: Romeo Ilarian Ciuperca, Atlanta, GA (US)

(73) Assignee: Greencraft LLC, Norcross, GA (US)

( * ) Notice: Subject to any disclaimer, the term of this patent is extended or adjusted under 35 U.S.C. 154(b) by 108 days.

(21) Appl. No.: 18/828,146

(22) Filed: Sep. 9, 2024

(65) Prior Publication Data

US 2025/0083989 A1 Mar. 13, 2025

Related U.S. Application Data

(60) Provisional application No. 63/582,424, filed on Sep. 13, 2023.

(51) Int. Cl.
*C03B 37/02* (2006.01)
*C03C 13/06* (2006.01)

(52) U.S. Cl.
CPC .............. *C03B 37/02* (2013.01); *C03C 13/06* (2013.01)

(58) Field of Classification Search
CPC ...................................................... C03B 13/06
See application file for complete search history.

(56) References Cited

U.S. PATENT DOCUMENTS

| | | | | |
|---|---|---|---|---|
| 4,095,986 | A | 6/1978 | Matsuda et al. | |
| 4,199,336 | A * | 4/1980 | Rittler | C03C 13/001 501/8 |
| 5,776,223 | A * | 7/1998 | Huang | C03B 37/02 264/177.17 |
| 8,343,400 | B2 | 1/2013 | Cordts et al. | |
| 9,771,294 | B1 | 9/2017 | Zubko et al. | |
| 11,884,602 | B1 | 1/2024 | Ciuperca | |
| 11,986,769 | B1 | 5/2024 | Ciuperca | |
| 12,122,726 | B1 | 10/2024 | Ciuperca | |
| 12,145,882 | B2 | 11/2024 | Ciuperca | |
| 12,291,488 | B2 | 5/2025 | Ciuperca | |
| 12,291,491 | B2 | 5/2025 | Ciuperca | |
| 2013/0143459 | A1 | 6/2013 | Li et al. | |
| 2018/0186673 | A1 | 7/2018 | Zubko et al. | |
| 2019/0359527 | A1 * | 11/2019 | Ciuperca | C04B 7/12 |
| 2025/0011232 | A1 | 1/2025 | Ciuperca | |
| 2025/0083989 | A1 | 3/2025 | Ciuperca | |

FOREIGN PATENT DOCUMENTS

| | | | | |
|---|---|---|---|---|
| DE | 1596818 | A1 | 5/1966 | |
| JP | 49-109409 | A1 | 10/1974 | |
| WO | WO-2022051598 | A2 * | 3/2022 | B01D 53/62 |

OTHER PUBLICATIONS

Samanta et al. "Post-Combustion CO2 Capture Using Solid Sorbents: A Review". Industrial & Engineering Chemistry Research, 2012 51 (4), 1438-1463. (Year: 2012).*
Gislason et al. "Rapid solubility and mineral storage of CO2 in basalt". Energy Procedia 63 (2014) 4561-4574. (Year: 2014).*
PCT, Written Opinion, International Application No. PCT/US 24/45794 corresponding to U.S. Appl. No. 18/828,146, filed Sep. 9, 2024.
EPO Extended Search Report, application No. 26160242.9-1014 dated Jul. 14, 2026 and corresponding to the present application.
Machine English Translation of JP 49-109409.
Machine English Translation of DE 1596818.
U.S. Appl. No. 19/542,623, filed Feb. 17, 2026.

* cited by examiner

*Primary Examiner* — Erin Snelting
(74) *Attorney, Agent, or Firm* — Robert E. Richards

(57) ABSTRACT

The invention comprises a method of making rockwool or mineral wool fiber insulation. The method comprises melting a natural calcium-iron-aluminosilicate mineral from one or more of hyaloclastite, lava, scoria, volcanic glass, volcanic ash, or any other mineral of a basaltic or intermediate chemical composition and spinning the molten product into fibers. The fibers are optionally combined with $CO_2$, a carbonation aid or a carbon dioxide sorbent microporous material.

18 Claims, No Drawings

ROCKWOOL FIBER INSULATION MANUFACTURE USING HYALOCLASTITE AND METHOD OF MAKING AND USING SAME

CROSS-REFERENCE TO RELATED APPLICATIONS

This application claims the benefit of application Ser. No. 63/582,424 filed Sep. 13, 2023.

FIELD OF THE INVENTION

The present invention generally relates to an improved method of manufacturing rockwool or mineral wool fibers or insulation using basaltic hyaloclastite. The present invention also relates to a method of making rockwool or mineral wool fibers using basaltic hyaloclastite that requires less energy than convention manufacturing methods thereby reducing carbon emissions. The present invention further relates to a method of carbon sequestration or mineralization by curing or combining $CO_2$ with mineral wool fibers or insulation manufactured using basaltic hyaloclastite.

BACKGROUND OF THE INVENTION

Mineral wool often is defined as any fibrous glassy substance made from minerals (typically natural rock materials such as basalt or diabase) or mineral products such as slag and glass. These materials are processed into insulation and other fibrous building materials that are used for structural strength and fire resistance. Generally, these products take one of four forms: (1) "blowing" wool or "pouring" wool, which is put into the structural spaces of buildings; (2) batts, which may be covered with a vapor barrier of paper or foil and are shaped to fit between the structural members of buildings; (3) industrial and commercial products such as high-density fiber felts and blankets, which are used for insulating boilers, ovens, pipes, refrigerators, and other process equipment; and (4) bulk fiber, which is used as a raw material in manufacturing other products, such as ceiling tile, wall board, spray-on insulation, cement, and mortar.

Most mineral wool produced in the United States today is produced from slag or a mixture of slag and rock. Most of the slag used by the industry is generated by integrated iron and steel plants as a blast furnace byproduct from pig iron production. Other sources of slag include the copper, lead, and phosphate industries. The production process has three primary components—molten mineral generation in the cupola, fiber formation and collection, and final product formation.

The first step in the process involves melting the mineral feed. The raw material (slag and rock) is loaded into a cupola in alternating layers with coke at weight ratios of about 5 to 6 parts mineral to 1 part coke. As the coke is ignited and burned, the mineral charge is heated to the molten state at a temperature of 1300 to 1650° C. (2400 to 3000° F.). Combustion air is supplied through tuyeres located near the bottom of the furnace. Process modifications at some plants include air enrichment and the use of natural gas auxiliary burners to reduce coke consumption. The molten mineral charge exits the bottom of the cupola in a water-cooled trough and falls onto a fiberization device.

Most of the mineral wool produced in the United States is made by variations of two fiberization processes. The first fiberization process, the Powell process, uses groups of rotors revolving at a high rate of speed to form the fibers. Molten material is distributed in a thin film on the surfaces of the rotors or dials and then is thrown off by centrifugal force. As the material is discharged from the rotor, small globules develop on the rotors and form long, fibrous tails as they travel horizontally. Air or steam may be blown around the rotors to assist in fiberizing the material. The second fiberization process, the Downey process, uses a spinning concave rotor with air or steam attenuation. Molten material is distributed over the surface of the rotor, from which it flows up and over the edge and is captured and directed by a high-velocity stream of air or steam. During the spinning process, not all globules that develop are converted into fiber. The nonfiberized globules that remain are referred to as "shot." In raw mineral wool fibers, as much as half of the mass of the product may consist of shot. Shot is usually separated from the wool by gravity immediately following fiberization. Depending on the desired product, various chemical agents may be applied to the newly formed fiber immediately following the rotor. In almost all cases, an oil is applied to suppress dust and, to some degree, anneal the fiber. This oil can be either a proprietary product or a medium-weight fuel or lubricating oil. If the fiber is intended for use as loose wool or bulk products, no further chemical treatment is necessary. If the mineral wool product is required to have structural rigidity, as in batts, matts, rolls and industrial felt, a binding agent is applied with or in place of the oil treatment. This binder is typically a phenol-formaldehyde resin that requires curing at elevated temperatures. Both the oil and the binder are applied by atomizing the liquids and spraying the agents to coat the airborne fiber.

After formation and chemical treatment, the fiber is collected in a blowchamber. Resin-coated and/or oil-coated fibers are drawn down on a wire mesh conveyor by fans located beneath the collector. The speed of the conveyor is set so that a wool blanket of desired thickness can be obtained. Mineral wool containing the binding agent is carried by conveyor to a curing oven, where the wool blanket is compressed to the desired density and the binder is baked. Hot air, at a temperature of 150 to 320° C. (300 to 600° F.), is forced through the blanket until the binder has set. Curing time and temperature depend on the type of binder used and the mass rate through the oven. A cooling section follows the oven, where blowers force air at ambient temperatures through the wool blanket.

To make batts, matts, rolls and industrial felt products, the cooled wool blanket is cut longitudinally and transversely to the desired size. Some insulation products are then covered with a vapor barrier of aluminum foil or asphalt-coated kraft paper on one side and untreated paper on the other side. The cutters, vapor barrier applicators, and conveyors are sometimes referred to collectively as a batt machine. Those products that do not require a vapor barrier, such as industrial felt and some residential insulation batts, can be packed for shipment immediately after cutting.

Loose wool products consist primarily of blowing wool and bulk fiber. For these products, no binding agent is applied, and the curing oven is eliminated. For granulated wool products, the fiber blanket leaving the blowchamber is fed to a shredder and pelletizer. The pelletizer forms small, 1-inch diameter pellets and separates shot from the wool. A bagging operation completes the processes. For other loose wool products, fiber can be transported directly from the blowchamber to a baler or bagger for packaging.

Alternatively, the mineral feed can be molten in a furnace that can be a gas or other type fuel burning furnace or an electric arc furnace. Regardless of the type of furnace used to melt the mineral feed the rest of the mineral wool or rockwool fibers or insulation manufacturing process steps are generally similar.

Currently the natural minerals used in the mineral wool manufacturing process are crystalline, such as basalt or gabbro. A crystalline mineral has a higher melting point when compared with an amorphous mineral or a partially amorphous mineral with similar chemical composition, and as a result it requires a higher temperature and a longer time in the melting furnace. This process requires a greater amount of energy consumption when compared with the manufacturing process described in the present invention, thereby resulting a lower $CO_2$ emissions. Additionally, the current processes do not cure or combine the fibers with $CO_2$ in any state or form. The present invention describes a process to cure or combine mineral wool fibers containing carbonatable minerals, such as Ca, Mg, Na, K, Fe and the like with $CO_2$.

SUMMARY OF THE INVENTION

In a disclosed embodiment, the present invention comprises a rockwool or mineral wool fiber insulation manufacturing process using a natural calcium-iron-aluminosilicate mineral, wherein the chemical composition preferably comprises approximately 30 to approximately 57 percent by weight $SiO_2$, approximately 10% to approximately 18% by weight $Al_2O_3$, approximately 8% to approximately 18% by weight $Fe_2O_3$, and approximately 4% to approximately 25% by weight CaO and preferably wherein the sum of the $Al_2O_3$+$Fe_2O_3$ is between approximately 20% to approximately 35% by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3$+$Fe_2O_3$ is preferably between approximately 1.25 and 2.25, ideally approximately 1.5.

In another disclosed embodiment, the present invention comprises a calcium-iron-aluminosilicate mineral from one or more of hyaloclastite, lava, volcanic ash, scoria, pumice or any igneous or sedimentary mineral with a basaltic or intermediate chemistry and with a mineral composition of at least 20% by weight amorphous content where the calcium-iron-aluminosilicate was formed from lava quenched by water which will result in lower energy consumption.

Accordingly, it is an object of the present invention to provide an improved rockwool or mineral wool fiber insulation manufacturing process with reduced $CO_2$ emissions.

Another object of the present invention is to provide an improved rockwool or mineral wool fiber insulation manufacturing process that uses less energy.

Another object of the present invention is to provide a rockwool or mineral wool fiber insulation manufacturing process that requires a lower temperature and process time in the furnace thereby reducing overall emissions and increasing the furnace production capacity when compared with current practice.

A further object of the present invention is to provide a manufacturing process to cure or combine the mineral wool fibers with $CO_2$ in any state or form. The present invention describes a process to cure or combine mineral wool fibers containing carbonatable minerals, such as Ca, Mg, Na, K, Fe and the like with $CO_2$.

Another object of the present invention is to provide a manufacturing process to cure or combine the mineral wool fibers containing carbonatable minerals, such as Ca, Mg, Na, K, Fe and the like with $CO_2$ and one or more carbonation aid or accelerant.

A further object of the present invention is to provide a manufacturing process to cure or combine the mineral wool fibers containing carbonatable minerals, such as Ca, Mg, Na, K, Fe and the like with $CO_2$ and one or more microporous materials optionally containing $CO_2$.

These and other objects, features and advantages of the present invention will become apparent after a review of the following detailed description of the disclosed embodiments and claims.

DETAILED DESCRIPTION OF THE DISCLOSED EMBODIMENTS

Hyaloclastite is a hydrated tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial ice field. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions; in particular, associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

Sometimes a subglacial or subaquatic eruption may produce a release of volcanic ashes that are ejected into the atmosphere after they pass through a body of water, which can then land back on the earth's surface. At times a fine volcanic particle size may be called a "volcanic ash" by different professionals in the geological field even though the ash definition may be debatable. It is also possible that a subglacial or subaquatic eruption may have been produced by a magma with high volume of gas entrapped in the lava. The high volume of gas exsolution may create a mineral with very high porosity or vesicular structure and bulk density similar to scoria or pumice, however all of the above are the result of lava quenched by water.

Volcanic calcium-iron-aluminosilicate minerals, such as hyaloclastite, lava, scoria, volcanic ash, or pumice, can be classified based on the amount of silica content as: basaltic (less than 53% by weight $SiO_2$), intermediate (approximately 53%-57% by weight $SiO_2$), or silicic such as andesitic (approximately 57%-63% by weight $SiO_2$), dacitic (approximately 63%-69% by weight $SiO_2$), or rhyolitic (greater than 69% by weight $SiO_2$). However, for the purpose of this invention the basaltic range starts at 40% $SiO_2$ and the intermediate range ends at 57% $SiO_2$.

Basaltic hyaloclastite, lava, scoria, volcanic ash or pumice contains generally 40% to 53% by weight silica ($SiO_2$) contained in an amorphous or crystalline form or a combination thereof essentially calcic plagioclase feldspar and pyroxene (usually Augite), with or without olivine. In addition to silica, basaltic hyaloclastite, volcanic ash or pumice generally comprises approximately 10% to approximately 18% by weight $Fe_2O_3$, approximately 6% to approximately 18% by weight CaO, approximately 5% to approximately 15% by weight MgO and other elements in various percentages. Intermediate basaltic hyaloclastite, volcanic ash or pumice generally comprises approximately 53% to approximately 63% by weight silica ($SiO_2$) content. For the purpose of this invention the intermediate basaltic hyaloclastite comprises approximately 53% to approximately 63% by weight silica ($SiO_2$) content. In addition to silica, intermediate basaltic hyaloclastite, volcanic ash or pumice generally comprises approximately 5% to approximately 10% by weight $Fe_2O_3$, approximately 6% to approximately 10% by weight CaO, approximately 3% to approximately 10% by weight MgO and other elements in various percentages. Basaltic hyaloclastite, volcanic ash or pumice may also contain quartz, hornblende, biotite, hypersthene (an orthopyroxene) and feldspathoids. The average specific density of basaltic hyaloclastite, volcanic ash or pumice is approximately 2.7-3.0 gm/$cm^3$.

The different types of calcium-iron-aluminosilicate minerals contain varying amounts of uncarbonated elements; i.e., Ca, Mg, K, Na and Fe, that when optionally mixed with one or more of limestone, dolomite, slag, olivine, alumina, bauxite or any other calcium or magnesium-based mineral improve the rockwool or mineral wool fiber insulation manufacturing process. As an example, the calcium-iron-aluminosilicate mineral, such as hyaloclastite, lava, scoria, volcanic ash or pumice classified based on the amount of silica content comprises the following elements: basaltic hyaloclastite, volcanic ash or pumice (less than approximately 53% by weight $SiO_2$), contains, CaO of approximately 6% to approximately 25% by weight, MgO approximately 5% to approximately 16% by weight, $K_2O$ approximately 0.5 to approximately 2% by weight, $Na_2O$ approximately 1% to approximately 3% by weight and $Fe_2O_3$ approximately 10% to approximately 18% by weight; intermediate hyaloclastite, volcanic ash or pumice (approximately 53% to approximately 57% by weight $SiO_2$) comprises CaO of approximately 6% to approximately 10% by weight, MgO approximately 3% to approximately 10% by weight, $K_2O$ approximately 1% by weight, $Na_2O$ approximately 3% by weight and $Fe_2O_3$ approximately 5% to approximately 10% by weight;

As used herein, the term "calcium-iron-aluminosilicate mineral" means hyaloclastite, lava, volcanic ash, scoria, pumice from any and all sources; i.e., all irrespective of the mineral source from which it is derived, unless otherwise designated, that is the product of magma or lava being quenched by or reacting with water, with an amorphous content of approximately 20% to approximately 100% by weight and a crystalline content of 0% to approximately 80% by weight, wherein the crystalline matrix is comprised of micro-crystals. The foregoing ranges include all of the intermediate values.

Basaltic or mafic calcium-iron-aluminosilicate such as hyaloclastite, volcanic ash, or pumice generally has approximately 6% to approximately 18% by weight uncarbonated calcium found with the amorphous matrix or a combination of amorphous and micro-crystalline matrix. As the amount of $SiO_2$ increases from the low of 40% by weight for basaltic hyaloclastite, volcanic ash, scoria or pumice to the andesitic and dacitic silica range, the uncarbonated calcium, magnesium, iron decreases to where in the rhyolitic range there is virtually no uncarbonated calcium available.

Mineral rock wool fibers are manufactured by melting a mineral raw feed composed of various minerals, such as slag, rock, clays, alumina, bauxite, limestone, dolomite, olivine sand and the like reduced to a suitable size according to the type of furnace use, such as gravel, sand or fine sand size, and feed into the melting furnace blended together or separately. The mineral feed composition resulting in the mineral fibers comprises approximately 40% to approximately 50% by weight $SiO_2$, approximately 6% to approximately 20% by weight $Al_2O_3$, approximately 6% to approximately 30% by weight CaO, approximately 5% to approximately 16% by weight MgO approximately 3% to approximately 10% by weight $Fe_2O_3$, approximately 1% to approximately 4% by weight $Na_2O$, approximately 0.5% to approximately 2% by weight $K_2O$, and other minor elements in various percentages.

A calcium-iron-aluminosilicate used as a mineral feed to manufacture wool fibers in accordance with the present invention is selected from a mineral having a chemical composition containing Si, Al, Ca, Mg, Na and K in the percentages and ranges shown above depending on the desired chemical composition of the mineral wool fiber product requirements. If one or more of these elements are in quantity less than the range shown above, then additional minerals or elements can be combined or added to the calcium-iron-aluminosilicate so that the target chemical composition is met. Such corrective minerals are known in the industry and among them limestone, dolomite, slag and olive sand are used to increase the Ca and Mg content and bauxite or alumina is used to increase the Al content. The addition of any one of these minerals results in a lower Si and Fe content of the mineral feed. The method of chemical composition optimization is well known in the industry.

Tables 1-2 below show chemical oxides analysis of calcium-iron-aluminosilicate mineral, such as hyaloclastite, volcanic ash, or pumice-based minerals from various sources and shows CaO levels as well as the $Fe_2O_3$, MgO, correlated with the $SiO_2$ and $Al_2O_3$ content. The values of the Si, Al, Ca, Mg, Fe, Na and K oxides shown in Table 1 below are examples of desirable oxide levels for rockwool or mineral wool fiber insulation production in accordance with the present invention.

TABLE 1

Desirable chemical compositions of calcium-iron-aluminosilicate mineral suitable for rockwool or mineral wool fiber insulation production

| Elements | LS36-10 | TDR | SND | AB | BKP | PVT | RDF | THR | VCR | PTR |
|---|---|---|---|---|---|---|---|---|---|---|
| $SiO_2$ | 45.20 | 45.00 | 47.70 | 47.20 | 46.36 | 48.50 | 50.60 | 52.85 | 54.94 | 60.39 |
| $Al_2O_3$ | 14.09 | 17.60 | 15.33 | 12.49 | 11.96 | 15.40 | 15.00 | 14.53 | 14.87 | 13.05 |
| Total $SiO_2$, $Al_2O_3$ | 59.29 | 62.60 | 63.03 | 59.69 | 58.32 | 63.90 | 65.60 | 67.38 | 69.81 | 73.44 |
| CaO | 14.77 | 12.70 | 11.51 | 11.51 | 9.68 | 9.37 | 9.16 | 8.94 | 8.84 | 6.69 |
| MgO | 6.11 | 7.27 | 10.89 | 11.06 | 5.50 | 6.57 | 7.78 | 4.94 | 4.93 | 6.37 |
| FeO | 13.07 | 12.90 | 12.75 | 12.04 | 15.38 | 13.00 | 10.20 | 12.03 | 9.85 | 7.21 |
| Total CaO, MgO, FeO | 33.95 | 32.87 | 35.15 | 34.61 | 30.56 | 28.94 | 27.14 | 25.91 | 23.62 | 20.27 |
| $Na_2O$ | 3.22 | 1.83 | 1.58 | 1.72 | 2.60 | 3.40 | 3.34 | 2.69 | 2.63 | 2.23 |
| $K_2O$ | 1.12 | 0.21 | 0.21 | 0.40 | 0.70 | 1.14 | 1.48 | 0.76 | 0.86 | 2.27 |
| Total Alkali | 4.34 | 2.04 | 1.79 | 2.12 | 3.30 | 4.54 | 4.82 | 3.45 | 3.49 | 4.50 |

TABLE 2

Desirable chemical compositions of calcium-iron-aluminosilicate mineral showing the desired ratios between various elements and sums of various elements

| Sample ID | CaO | MgO | $Al_2O_3$ | $Fe_2O_3$ | $SiO_2$ | Sum CaO + MgO (%) | Sum $Al_2O_3$ + $Fe_2O_3$ (%) | Ratio $Al_2O_3$ to $Fe_2O_3$ | Ratio $SiO_2$ to Sum ($Al_2O_3$ + $Fe_2O_3$) |
|---|---|---|---|---|---|---|---|---|---|
| LS36-10 | 14.77% | 6.11% | 14.09% | 13.07% | 45.20% | 20.88% | 27.16% | 1.08 | 1.66 |
| TDR | 12.70% | 7.27% | 17.60% | 12.90% | 49.50% | 19.97% | 30.50% | 1.36 | 1.62 |
| SND | 11.51% | 10.89% | 15.33% | 12.75% | 48.90% | 22.40% | 28.08% | 1.2 | 1.74 |
| AB | 11.51% | 11.06% | 12.49% | 14.20% | 47.20% | 22.57% | 26.69% | 0.88 | 1.77 |
| BKP | 9.68% | 6.57% | 11.96% | 15.38% | 46.36% | 16.25% | 27.34% | 0.78 | 1.7 |
| PVT | 9.37% | 6.57% | 15.40% | 13.00% | 48.50% | 15.94% | 28.40% | 1.18 | 1.71 |
| RDF | 9.16% | 7.78% | 15.00% | 14.10% | 50.60% | 16.94% | 29.10% | 1.06 | 1.74 |
| THR | 8.94% | 4.94% | 14.53% | 12.03% | 52.85% | 13.88% | 26.56% | 1.21 | 1.99 |
| VCR | 8.84% | 4.93% | 14.87% | 9.85% | 54.94% | 13.77% | 24.72% | 1.51 | 2.22 |
| PTR | 6.69% | 6.37% | 13.05% | 7.21% | 60.39% | 13.06% | 20.26% | 1.81 | 2.98 |

In the samples above in Tables 1 and 2, all except the PTR examples show desirable properties for the use as a calcium-iron-aluminosilicate mineral for the manufacture of rockwool or mineral wool fiber insulation in accordance with the present invention. All samples above are minerals sampled, processed and analyzed by the inventor from various location around the world. The three-letter designation refers to the mineral source.

These samples of a calcium-iron-aluminosilicate mineral show adequate replacement of the current mix used in the mineral wool fibers manufacturing process containing iron slag, alumina, bauxite, suitable clay and silica mineral mixed with limestone or dolomite in current manufacture of rockwool or mineral wool fiber insulation. Of relevance to select a calcium-iron-aluminosilicate mineral is the Al ratio to Fe ($Al_2O_3/Fe_2O_3$) preferably close to 1 and more preferably approximately 0.75 to approximately 1.5.Additionally, the high $Fe_2O_3$ concentration, especially in an amorphous or microcrystalline or a combination thereof matrix will promote melt phase formation at lower temperature, improving burnability and reducing dusting at the furnace inlet as well as reducing the furnace mineral melting processing time. Especially important is the amorphous and microcrystalline content that further acts to lower the melt point at lower temperature. This in turn reduces energy consumption and increases the output of the rockwool or mineral wool fiber insulation production line which in turn reduces the energy consumption and $CO_2$ emissions.

It is also important to have a low Si ratio to the sum of Fe and Al ($SiO_2/(Fe_2O_3+Al_2O_3)$) preferably of approximately 1.5, or more preferably approximately 1.25 to approximately 2.25 which will improve burnability as well and promote easier formation of rockwool or mineral wool fiber insulation. The improvement of burnability will decrease specific energy consumption of rockwool or mineral wool fiber insulation melting or burning, hence decreased $CO_2$ and $NO_x$ emissions from burning less fuel.

The mineral in accordance with the present invention also contains good amounts of CaO, preferably approximately 8% to approximately 25% by weight, most preferably as un-carbonated Ca, or a combination of un-carbonated and carbonated Ca, thus proportionally reducing $CO_2$ emissions from the furnace stack.

The sodium equivalent ($Na_2O$+0.658 $K_2O$) of the mineral in accordance with the present invention may be relatively high, but, e.g., not much different from a conventional clays or slag currently used in the mineral wool production; however, this amount should be taken in due consideration based on the actual replacement rate of the material in the raw mix, therefore the actual increase of alkali in the rockwool or mineral wool fiber insulation, and specific requirements for use in presence of reactive aggregates (low-alkali cement).

The present invention allows for fine tuning or meeting specific mineral wool fibers chemical composition depending on the application or regulatory requirement that may differ from jurisdiction to jurisdiction and may be changing over time Mineralogy XRD data confirms same of the above mentioned, namely practical absence of quartz. The absence of quartz has an additional positive impact, in conjunction with the sandy nature of the quartz material used in current practice. Quartz is a hard mineral requiring high and specific grinding energy to melt. The calcium-iron-aluminosilicate mineral contains CaO that is distributed between amorphous, carbonates and feldspars, which in turn will contribute to decreasing $CO_2$ emissions during burning; i.e., melting.

The first three samples in Table 1 and 2 above, LS36-10, TDR and SND, show a basaltic chemistry with the $SiO_2$ of approximately 45-47% and $Al_2O_3$ of 14-17.6% this results in a total silica and alumina content of 59.29-63.03%. The sum of CaO and MgO is between 20% and 22.4%. These samples also have a desirable sum of the CaO and MgO which make them particularly suitable to be used as mineral fiber raw feed without any additional minerals.

The next three samples, AB, BKP and PVT, have similar basaltic chemical composition of total silica and alumina of 59.69-63.9% and a total amount of uncarbonated calcium, magnesium and iron oxides of 28.94-34.61%. The sum of CaO and MgO is between 16% and 22.5%. These samples also have a desirable sum of the CaO and MgO which make them suitable to be used as mineral fiber raw feed with or without any additional minerals. If the Ca and/or Mg needs to be increased, limestone, dolomite or olivine sand can be added to a mix containing one of these samples.

The next two samples, RDF and THR, have similar basaltic chemical composition of total silica and alumina slightly higher of 65.6-67.38% and a total amount of uncarbonated calcium, magnesium and iron oxides of 25.91-27.14%. The sum of CaO and MgO is between 14% and 16%. These samples have a less desirable sum of the CaO and MgO, however a more suitable raw feed can be obtained with additional minerals to increase the Ca and Mg. Ca and/or Mg can be increased by adding limestone, dolomite or olivine sand to a mix containing one of these samples.

The next sample, VCR, has an intermediate chemical composition of total silica and alumina slightly higher of 69.81% The last sample, PTR, has an andesitic chemical composition of total silica and alumina slightly higher of 73.44%. The sum of CaO and MgO is approximately 13% to 14%. These two samples have a less desirable sum of the CaO and MgO and to make them suitable to be used as mineral fiber raw feed require additional minerals to increase the Ca and Mg. Ca and/or Mg can be increased by adding limestone, dolomite or olivine sand to a mix containing one of these samples.

Chemical composition as reported herein is measured by the XRF (X-ray fluorescence) method. This is a non-destructive analytical technique used to determine the elemental composition of materials. XRF analyzers determine the chemistry of a sample by measuring the fluorescent (or secondary) X-ray emitted from a sample when it is excited by a primary X-ray source. Each of the elements present in a sample produces a set of characteristic fluorescent X-rays ("a fingerprint") that is unique for that specific element, which is why XRF spectroscopy is an excellent technology for qualitative and quantitative analysis of material composition. The chemical analysis reported herein is the total oxides scan.

Sample preparation for XRF can be achieved using either of two distinct methods: a pressed powder and a fused glass disk. Pressed powder specimens are typically ground in a tungsten carbide ring and puck mill with a binding agent to reduce the particle size and provide a packed powder mount that will remain intact for transport and analysis. The advantages of this preparation method include the simplicity and better detection limits while disadvantages include what is known as the "mineralogical effect", which requires a similar matrix between a bracketed calibration and unknown specimens for the calibrations to be valid.

In case of the calcium-iron-aluminosilicate mineral such as hyaloclastites, lava, gabbro, scoria, volcanic ashes, pumice, etc., they may contain some degree of crystalline elements, the calcium, iron, alumina, silicates, and other elements are contained in micro-crystals, such as clinopyroxene $Ca(Mg,Fe,Al,Ti)(Si,Al)_2O_6$, calcium plagioclase feldspars $(Na,Ca)Al(Si,Al)_3O_8$, olivine $(Fe,Mg)_2SiO_4$ are examples of crystalline materials that contain uncarbonated elements, such as calcium, magnesium, potassium, sodium and iron, that are available to combine with CaO from the process of rockwool or mineral wool fiber insulation manufacturing process to create rockwool or mineral wool fiber insulation with reduced emissions and reduced energy consumption in accordance with this present invention. The calcium, iron, magnesium, aluminum, silica elements, and others, can be found in igneous rocks created by lava quenched by water or interaction with water such as lava, scoria, volcanic ashes, pumices and hyaloclastites of these chemistries can be in amorphous or microcrystalline form or a combination thereof.

Table 3 below shows examples of calcium-iron-aluminosilicate mineral such as hyaloclastites, lava, volcanic ashes, or pumices that contain various amounts of amorphous and crystalline content. Samples 14 and 15 are rhyolitic glass such as perlite and the CaO content is below 1% compared with the basaltic in Samples 1-13 where CaO ranges between 9-16%.

TABLE 3

| | "Amorphous" | Clinopyroxene Ca(Mg, Fe, Al, Ti) (Si, Al)2O6 | Plagioclase Feldspar (Na, Ca)Al(Si, Al)3O8 | Olivine (Fe, Mg)2SiO4 | Calcite | Unidentified |
|---|---|---|---|---|---|---|
| 1 | >70 | — | 12 | 5 | 7 | <5 |
| 2 | >80 | | 10 | <5 | — | <5 |
| 3 | >70 | <3? | 11 | <5 | — | <5 |
| 4 | >80 | — | 13 | <3 | — | <5 |

TABLE 3-continued

| | "Amorphous" | Clinopyroxene Ca(Mg, Fe, Al, Ti) (Si, Al)2O6 | Plagioclase Feldspar (Na, Ca)Al(Si, Al)3O8 | Olivine (Fe, Mg)2SiO4 | Calcite | Unidentified |
|---|---|---|---|---|---|---|
| 5 | >55 | | 12 | 5 | 20 | <5 |
| 6 | >70 | — | 11 | 5 | <5 | <5 |
| 7 | >75 | — | 10 | 5 | — | <5 |
| 8 | >65 | — | 15 | 5 | <5 | <5 |
| 9 | >70 | <3? | 12 | 5 | | <5 |
| 10 | >30 | 25 | 43 | 5 | | <5 |
| 11 | >55 | | 15 | 5 | 15 | <5 |
| 12 | >40 | 17 | 37 | 4 | 1 | <5 |
| 13 | >70 | — | 15 | 8 | | <5 |
| 14 | >95 | | | | | <5 |
| 15 | >95 | | | | | <5 |

Samples 1 to 13 in Table 3 above have desirable compositions for use in accordance with the present invention for forming rockwool or mineral wool fiber insulation.

In one disclosed embodiment of the present invention, the calcium-iron-alumina-silicate mineral to be used optionally in conjunction with limestone, dolomite, bauxite, olivine and other minor constituents for the manufacture of rockwool or mineral wool fiber insulation, such as hyaloclastite, lava, scoria, volcanic ash or pumice, or any other igneous rock, created from lava quenched by water, such as a calcium-iron-aluminosilicate mineral wherein the chemical composition preferably comprises approximately 30% to approximately 63% by weight $SiO_2$, approximately 6% to approximately 18% by weight $Al_2O_3$, approximately 6% to approximately 18% by weight $Fe_2O_3$, approximately 6% to approximately 16% by weight MgO, approximately 4% to approximately 25% by weight CaO, approximately 1% to approximately 25% by weight $Na_2O$, approximately 0.5% to approximately 3% by weight $K_2O$ and preferably wherein the sum of the $Al_2O_3$+$Fe_2O_3$ is between approximately 20% to approximately 35% by weight, preferably wherein the ratio between the $Al_2O_3$ and the $Fe_2O_3$ is approximately 0.75 and approximately 1.50 ideally or approximately 1 and the ratio between the $SiO_2$, the sum of the $Al_2O_3$+$Fe_2O_3$ is preferably between approximately 1.25 and 2.25, ideally approximately 1.5 and the sum of the CaO and MgO is between approximately 12% to approximately 30%.

In addition to the foregoing, other compounds can be present in small amounts, such as, $TiO_2$, $P_2O_5$, MnO, various metals, rare earth trace elements and other unidentified elements. When combined, these other compounds represent less than 10% by weight of the total chemical composition of the calcium-iron-aluminosilicate mineral such as hyaloclastite, lava, scoria, volcanic ash or pumice mineral.

In another disclosed embodiment, the calcium-iron-aluminosilicate mineral such as hyaloclastite, lava, scoria, volcanic ash or pumice in accordance with the present invention preferably has a density or specific gravity of approximately 2.4 to approximately 3.1.

The calcium-iron-aluminosilicate mineral in accordance with the present invention can be in crystalline or amorphous (glassy) form and is usually found as a combination of both in varying proportions where the crystal matrix contained therein comprises microcrystals. Preferably, the hyaloclastite, volcanic ash or pumice in accordance with the present invention comprises approximately 0% to 100% by weight amorphous form, more preferably approximately 10% to approximately 80% by weight amorphous form, most preferably approximately 20% to approximately 60% by weight amorphous form, especially approximately 30% to approximately 50% by weight amorphous form. Preferably, the calcium-iron-aluminosilicate mineral such as basaltic hyaloclastite comprise approximately 10% to 100% by weight amorphous form, more preferably approximately 20% to 100% by weight amorphous form, most preferably approximately 30% to 100% by weight amorphous form, especially approximately 40% to 100% by weight amorphous form, more especially approximately 50% to 100% by weight amorphous form, most especially approximately 60% to 100% by weight amorphous form and especially approximately 70% to 100% by weight amorphous form. The microcrystalline portion of calcium-iron-aluminosilicate such as hyaloclastite, lava, scoria, volcanic ash, pumice, sideromelane or tachylite preferably comprises approximately 0% to approximately 20% by weight olivine, approximately 0% to approximately 40% by weight clinopyroxene, approximately 0% to approximately 60% by weight plagioclase, and 0% to approximately 40% (or less than 40%) by weight, other minerals are included, but not limited to, magnetite, UlvoSpinel, quartz, feldspar, pyrite, illite, hematite, chlorite, calcite, homblende, biotite, K-feldspars, mordenite, clinoamphibole, ilmenite hypersthene (an orthopyroxene), feldspathoids sulfides, metals, rare earth minerals, other unidentified minerals and combinations thereof. The foregoing ranges include all of the intermediate values.

The calcium-iron-aluminosilicate mineral in accordance with the present invention can be used to produce rockwool or mineral wool using convention processing equipment and processing steps as described above with respect to the prior art using any conventional fuels burning in any conventional furnace or by using an electric furnace. The type of fuel or furnace used to produce the mineral wool is not an important feature of the present inventions and with minor adjustment any currently used type of fuel or furnace can be used in the current invention.

It has also been discovered as a part of the present invention to expose the calcium-iron-aluminosilicate mineral in accordance with the present invention to elevated levels of $CO_2$ during any one or more or all of the manufacturing steps of producing rockwool or mineral wool fibers. Specifically, it is desirable to expose the ground calcium-iron-aluminosilicate mineral to elevated levels of $CO_2$ during the spinning process; i.e., fiber making process (fiberization process); during the collection process on mineral wool insulation on the wire mesh conveyor, during the resin application process, during the annealing process; during the shaping and/or cutting process or during the packaging or storage process. In particular, as a part of the present invention a high velocity stream of $CO_2$, either alone or in combination with steam, at elevated temperature or at ambient temperature, at elevated pressure (such as up to and including 3 atmospheres), at ambient pressure or at sub-ambient pressure, can be used to form the fibers or to expose the mineral wool insulation to $CO_2$ at any one of the manufacturing process points described above in either the Powell, the Downey process or any other process in current or future use regardless of the type of fuel or furnace used.

As used herein, the term "exposed" to $CO_2$ or "sprayed", treated", "combined" or "cured" means $CO_2$ in gaseous, solid or liquid form or $CO_2$ in combination with any one or more of carbonation aids, accelerants or carbon absorbent microporous materials. In gaseous form, the $CO_2$ is in a concentrated form; i.e., at a concentration higher than found in air at standard temperature and pressure or greater than 0.04% by weight as of the filing date of the present application; preferably approximately 1% to 100% $CO_2$, more preferably approximately 5% to 100% $CO_2$. The foregoing ranges includes all of the intermediate values.

In another disclosed embodiment the $CO_2$ used in the present invention to spray, combine or cure the mineral wool insulation can be combined with any one or more carbonation accelerants or aids having $CO_2$ bound to the carbonation aid at a concentration higher than found in air at standard temperature and pressure or greater than 0.04% by weight as of the filing date of the present application; preferably approximately 1% to 100% $CO_2$, more preferably approximately 5% to 100% $CO_2$. The foregoing ranges includes all of the intermediate values.

It is also desirable that the $CO_2$ curing of the mineral wool insulation is aided by a carbonation aid or accelerant that will enhance the mineral wool fibers affinity to attract and bind, absorb or adsorb $CO_2$ onto its surface or pores either through a physical, a chemical or electrostatic process. Such carbonation aids bind or attached $CO_2$ onto the mineral wool fibers surface or pores either through a physical, a chemical or electrostatic process. Such carbonation aids or accelerants are known in the industry and different types work differently to accomplish similar properties. There are different types of carbonation aids or accelerants such as ammonium salts, amines, alkanoamines for example monoethanolamine (MEA) and diglycolamine (DGA), aliphatic amines such as (triethylenete-tramine (TETA)) and tetraethylenepentamine (TEPA)) and alcoholamines (diethanolamine (DEA), triethanolamine (TEA) and triisopropanolamine (TIPA)). Glycol compounds are represented as ethylene glycol (EG) and diethylene glycol (DEG). In addition, there are more complex compounds such as aminoethylethanolamine (AEEA) and diethylenetri-amine hydroxyethyl (HEDETA). Additional compounds that can bind $CO_2$ and accelerate carbonation include alkanalamines. Phenol and phenol-derivatives are also used as grinding aids or any combinations thereof of one or more of the above. By using carbonation aids or accelerants, the organic additives are adsorbed or absorbed on the surface or pores of the mineral wool fibers. The organic additives also change the electrostatic forces between the particles by reducing the attraction forces (Van der Waal) and increasing the repulsive forces. The additives are thus behaving as surfactants. Many carbonation enhancing additives are reported to give beneficial effects during the mineral wool fibers uncarbonated elements reacting with CO2. Additionally, the $CO_2$ adsorption enhancer and carbonation accelerant enhances the amount of $CO_2$ stored on the surface, or in close proximity thereto, of the mineral wool fibers to be available to carbonate the carbonatable elements contained therein.

A protein such as carbonic anhydrase can also be used as a carbonation aid or accelerant to coat the mineral wool fibers surface so that it binds, absorbs, adsorbs or otherwise stores $CO_2$ on the surface or pores. Peptides, barnacle cement protein, cement proteins can also be used. Six barnacle-specific cement proteins (CPs) have been identified, four of which are thought to be interface proteins, CP19k, −20 k, −43 k, and −68 k, and two bulk proteins, CP52k and CP100k. Soy protein may also be used in a ratio of 0.05-1.5% by weight to the mineral wool fibers at anyone point described above during the manufacturing process. Carbon nanomaterials can also be combined with or sprayed onto the mineral wool fibers.

Any one or more of the carbonation aids, $CO_2$ adsorption or absorption enhancers, carbonation enhancers, such as the carbon microporous materials, zeolites, carbonation accelerants and/or $CO_2$ adsorption enhancing compounds, steam, or any combination thereof, any aids in the $CO_2$ binding or adsorption process and/or the carbonation process, as described in the present inventions regardless of the nature of compositions as described in the present invention can be added or blended during the manufacturing or post manufacturing process to enhance the $CO_2$ adsorption, absorption and/or carbonation process. We call these elements $CO_2$ adsorption enhancers and/or carbonation accelerants that serve to bind and provide additional amounts of $CO_2$ to the mineral wool fibers either on the surface thereof, or in close proximity thereto, so that it is present to react with the carbonatable elements contained therein over time. Optionally, the mineral wool fiber can be placed into a $CO_2$ curing chamber where $CO_2$ is injected or combined with the mineral wool fibers. Alternatively, once the mineral wool fibers have been placed in plastic bags, $CO_2$ in various amounts or combined with any one or more of the $CO_2$ carbonation aids, enhancers or microporous adsorbent materials can be injected or added to the inside of the bag so that it is released to react with the carbonatable minerals contained within the mineral wool fibers. In other words, the plastic bag used to package the mineral wool fibers may become a $CO_2$ curing chamber.

Porous organic polymers (POPs) are generally defined as a group of covalent organic porous materials with high porosity made of light different elements (carbon, boron, hydrogen, oxygen, and nitrogen) and strong covalent bonds. These organic macromolecules have high specific surface areas, tunable porosities, low densities, high chemical and thermal stabilities, variable compositions, convenient post-functionalization, extended π-conjugations, and their high contents of carbon, nitrogen, oxygen, and other non-metallic atoms. POPs have been classified into four types: covalent triazine frameworks (CTFs), hypercrosslinked polymers (HCPs), covalent organic frameworks (COFs), and conjugated microporous polymers (CMPs). All POPs are amorphous materials—except for a small number of CTFs and COFs that are crystalline materials with ordered structures prepared under thermodynamic control. Like nanoporous materials, POPs have many potential applications because of their high surface areas and uniform pore sizes, with large numbers of channels and active sites available for chemical reactions. Examples of these types of polymers are nitrogen-enriched microporous polymers containing various contents of amino groups through condensation reactions of melamine with formohydrazide, formamide, N,N-dimethylformamide (DMF), and N-methylformamide, 1,2,3-triazolo units; their Tz-CTF polymeric frameworks, hollow microspherical and microtubular carbazole-based COFs through condensations of Car-$3NH_2$ and the triformyl linkers TPA- 3CHO, TPP-3CHO, and TPT-3CHO with various degrees of planarity, triarylamine monomers based (TPT-based COFs), β-ketoenamine-linked COFs (TFP-TPA, TFP-Car, and TFP-TPP) and the like. The porous organic polymers can adsorb or be embedded with carbon dioxide separately from the mineral wool manufacturing process and used as a carbon dioxide delivery vehicle to the mineral wool fibers then sprayed, injected or combined with the mineral wool fibers. Alternatively, porous organic polymers can be used as a carbonation aid and fed or injected into mineral wool fibers either in the presence of carbon dioxide or atmospheric air. In other words, these polymers provide an enhanced amount of carbon dioxide on the surface of, or in close proximity to, the mineral wool fiber's surface so that the carbon dioxide can react with the carbonatable elements in the mineral wool fibers over time while the mineral wool fibers and the porous organic polymers are creating carbonated minerals or compounds of various types.

Quinones are a special class of ketones in which carbonyl groups are a part of an aromatic ring of benzene, anthracene, or naphthalene such as ubiquitous biological pigments found in a range of living organisms (bacteria, fungi, higher plants, and in few animals). They exist in nature in many forms such as benzoquinones, naphthoquinones, anthraquinones, and polycyclic quinones. For example, the K vitamins (phylloquinone) are naphthoquinones. Quinones can adsorb or be embedded with carbon dioxide separately from the mineral wool manufacturing process and used as a carbon dioxide delivery vehicle to the mineral wool fibers then mixed with the mineral wool fibers. In other words, quinones provide an enhanced amount of carbon dioxide on the surface of or in close proximity to the mineral wool fibers surface so that the carbon dioxide can react with the carbonatable elements or over time therefore the carbon dioxide mineralize to carbonatable elements contained in the carbonatable mineral wool fibers creating carbonated minerals of various types. Alternatively, the carbonatable mineral wool fibers combined with quinones can be exposed to carbon dioxide during or post-manufacturing process at ambient or elevated temperatures, and optionally with steam, such as described in the current invention.

Ionic liquids (IL) are salts in the liquid state. In some contexts, the term has been restricted to salts whose melting point is below a specific temperature, such as 100° C. (212° F.).

The ionic bond is usually stronger than the Van der Waals forces between the molecules of ordinary liquids. Because of these strong interactions, salts tend to have high lattice energies, manifested in high melting points. Some salts, especially those with organic cations, have low lattice energies and thus are liquid at or below room temperature. Examples include compounds based on the 1-ethyl-3-methylimidazolium (EMIM) cation and include: EMIM:Cl, EMIMAc (acetate anion), EMIM dicyanamide, $(C_2H_5)(CH_3)C_3H_3N^+{}_2{\cdot}N(CN)^-{}_2$, that melts at −21° C. and 1-butyl-3,5-dimethylpyridinium bromide which becomes a glass below −24° C. In particular room-temperature ionic liquids (RTILs) are dominated by salts derived from 1-methylimidazole, i.e., 1-alkyl-3-methylimidazolium. Examples include 1-ethyl-3-methyl-(EMIM), 1-butyl-3-methyl-(BMIM), 1-octyl-3 methyl (OMIM), 1-decyl-3-methyl-(DMIM), 1-dodecyl-3-methyl-docecyl (MIM). Other imidazolium cations are 1-butyl-2,3-dimethylimidazolium (BMMIM or DBMIM) and 1,3-di(N,N-dimethylaminoethyl)-2-methylimidazolium (DAMI). Other N-heterocyclic cations are derived from pyridine: 4-methyl-N-butyl-pyridinium (MBPy) and N-octylpyridinium (C8Py). Conventional quaternary ammonium cations also form ILs; e.g., tetraethylammonium (TEA) and tetrabutylammonium (TBA). Certain types of Ionic Liquids can adsorb or be embedded with carbon dioxide separately from the mineral wool fibers manufacturing process and used as a carbon dioxide delivery vehicle to the carbonatable mineral wool fibers then mixed with the carbonatable mineral wool fibers creating carbonated minerals or compounds of various types. Alternatively, the carbonatable mineral wool fibers coated with ionic liquids can be exposed to carbon dioxide during or post-manufacturing process at ambient or elevated temperatures, and optionally with steam, such as described in the current invention.

Covalent organic frameworks (COFs) are a type of organic crystalline porous material, prepared through reticular chemistry with building blocks featuring light elements (such as C, H, O, N, or B atoms), and connected through covalent bonds and extended in two or three dimensions. Examples of covalent organic frameworks are based on the condensations of widely used types of linkages in COFs such as boroxine, boronic ester, imine, hydrazone, azine, β-ketoenamine, imide, borazine, 1,4-dioxin, C═C bond, phenazine, triazine, urea, squaraine, and double-linkage. The chemical stability of covalent organic frameworks can be improved with the synthesis of β-ketoenamines from 1,3,5-triformylphloroglucinol (TFP-3OHCHO) and primary amines, through irreversible enol-keto tautomerization, creating robust networks that resist strong acids and bases. Covalent organic frameworks can adsorb or be embedded with carbon dioxide separately from the carbonatable mineral wool fibers manufacturing process and used as a carbon dioxide delivery vehicle to the carbonatable mineral wool fibers then mixed with the carbonatable mineral wool fibers. In other words, covalent organic frameworks provide an enhanced amount of carbon dioxide on the surface of or in close proximity to the carbonatable mineral wool fibers surface so that the carbon dioxide can react with the carbonatable elements during the manufacturing process or over time. Alternatively, the carbonatable mineral wool fibers coated with covalent organic frameworks can be exposed to carbon dioxide during or post-manufacturing process at ambient or elevated temperatures, and optionally with steam, such as described in the current invention.

Metal-organic frameworks (MOFs) are organic-inorganic hybrid crystalline porous materials that consist of a regular array of positively charged metal ions surrounded by organic 'linker' molecules. The metal ions form nodes that bind the arms of the linkers together to form a repeating, cage-like structure. Due to this hollow structure, MOFs have an extraordinarily large internal surface area and can adsorb or embed significant amounts of carbon dioxide in its pore structure. So far, more than 90,000 different MOF structures have been reported and over 500,000 are predicted to be possible. Metal Organic Frameworks (MOFs) constitute a class of solid porous materials, which consist of metal ions or metallic clusters, which act as nodes, and polydentate organic ligands, which act as linkers between the nodes. The metal nodes (metal ions or metallic clusters) act as connection points and the organic ligands bridges the metal centers through coordination bonds, thus, forming networks of one-dimension, two-dimensions, or three-dimensions. The main structural features of the MOFs, which are directly related to their properties and applications, are the high porosity, the large volume of the pores, which can reach the 90% of the crystalline volume or more, the large specific surface area (several thousand $mg^2{\cdot}g^{-1}$), and the high thermal stability (250-500° C.) due to the presence of strong bonds (e.g., C—C, C—H, C—O, and M—O). Examples of MOFs are Isoreticular Metal Organic Frameworks (IR-MOFs), such as IRMOF-3 containing 2-amino-1,4-benzenedicarboxylic acid can undergo chemical modification with a diverse series of anhydrides and isocyanates yielding isostructural MOFs containing different functional groups, MOF-74-Mg, which is the magnesium analogue of MOF-74, shows the highest $CO_2$ uptake capacity of 228 and 180 $cm^3 \cdot g$ −1 at 273 and 298 K and 1 bar, respectively, MOF-74-Mg, MOF-210 has a very high surface area of 10,450 $m^2 \cdot g$ −1 and shows a $CO_2$ uptake value of 2400 $mg \cdot g^{-1}$(74.2 wt %, 50 bar at 298 K), MOF-177 or MIL-101(Cr) (60 wt % and 56.9 wt %, respectively), MOF-200, MOF-210 under similar conditions. Other MOFs, which show considerably higher $CO_2$ uptake compared with other solid materials, are the NU-100 (69.8 wt %, 40 bar at 298 K), the MOF-5 (58 wt %, 10 bar at 273 K), HKUST-1 (19.8 wt %, 1 bar at 298 K), MIL-100(Fe), a Porous Iron Trimesate with a Hierarchical Pore Structure, cyclodextrin based MOFs, IRMOF-74-III-$CH_2NH_2$, IRMOF-74-III-$CH_2$NHMe, carbamic types and the likes. Metal-organic frameworks can adsorb or be embedded with carbon dioxide separately from the carbonatable mineral grinding process and used as a carbon dioxide delivery vehicle to the carbonatable mineral wool fibers then mixed with the carbonatable mineral wool fibers. Alternatively, Metal-organic frameworks can be used as carbonation aids or enhancers and fed or injected into the mineral wool fibers while the carbonatable mineral wool fibers are manufactured either in the presence of the carbon dioxide or atmospheric air. In other words, Metal-organic frameworks provide an enhanced amount of carbon dioxide on the surface of or in close proximity to the carbonatable mineral wool fibers surface so that the carbon dioxide can react with the carbonatable elements during the manufacturing process or over time and therefore the carbon dioxide mineralizes the carbonatable elements contained in the carbonatable mineral wool fibers creating carbonated minerals or compounds of various types. Alternatively, the carbonatable mineral wool fibers combined with Metal-organic frameworks can be exposed to carbon dioxide post-manufacturing process at ambient or elevated temperatures, and optionally with steam such as described in the current invention.

Polymer brushes are special macromolecular structures with polymer chains densely tethered to another polymer chain (one-dimensional, 1D) or the surface of a planar (two-dimensional, 2D), spherical or cylindrical (three-dimensional, 3D) solid via a stable covalent or noncovalent bond linkage. In comparison with the corresponding linear counterpart with similar molecular composition, one-dimension polymer brushes have useful properties to adsorb gases including wormlike conformation, compact molecular dimension, and notable chain end effects due to their compact and confined densely grafted structure. Polymer brushes are composed of long macromolecules that are anchored by one chain-end to a surface at a density that is high enough such that the polymers stretch out, away from the surface. These brushes have become popular surface modifications in the development of adsorbent surfaces. As such, they can be broadly applied, ranging from (bio) medical materials to membrane technologies. Moreover, polymers are responsive to small changes in their environment, such as temperature, pH, or solvent composition. A polymer brush is a coating comprised of polymer chains, end-anchored to a substrate at a high areal density. These brushes can be composed of negatively charged anionic or positively charged cationic polyelectrolytes, zwitterionic polymers and neutral macromolecules or copolymers containing different types of monomers. Individually, surface-anchored polymers behave comparably to free polymers, assuming conformations that minimize their free energy, which consists of contributions from solvent, substrate, and polymer-polymer contacts, and the conformational entropy of the chain. In the simplest case, this is a "mushroom": a surface-anchored analogue to the coil and globule states found in free polymers. Under poor solvent conditions, however, the most favorable conformation is often a "pancake" state in which the polymer backbone adsorbs to the grafting surface. When the density of polymers on the surface becomes sufficiently high, the polymers start to overlap and volume interactions cause the chains to stretch away from the surface. This structure of "bristles" extending away from the substrate gives the polymer brush its name. The properties of polymer brushes alter in response to their environment as well, which has been utilized to control adhesion and friction, channel flow, drug release, and more. The monolithic materials are studied in terms of porosity and structure to investigate the $CO_2$ adsorption and how the capacity is affected by the initial particles compared with the ones with polymer brushes. Polymer brushes can be synthesized from any number of polymers among them poly (acrylic acid) (PAA), poly(vinyl caprolactam) (PVCL), and poly[(2-(methacryloyloxy)ethyl)trimethylammonium chloride](PMETAC) A range of composite monoliths can be synthesized rGO monolith (G), rGO/$CeO_2$ (GCe), rGO/$CeO_2$/PAA (GCePA), rGO/$CeO_2$/PVCL (GCePV), and rGO/$CeO_2$/PMETAC (GCePM)—that offers the possibility to study the effect of different functional polymers inside a monolith on the $CO_2$ adsorption. The use of polymer brushes with different responses in different environments, such as pH, can show other aggregations of the particles with the polymer brushes. Thus, it can also affect the preparation of the monolith with the addition of particles with different functionalities and responses. Polymer brushes can be grafted on to the surface of the carbonatable mineral wool fibers to enhance the $CO_2$ adsorption properties and store an enhanced quantity of $CO_2$ of the surface of the carbonatable mineral wool fibers surface. The polymer to create the polymer brushes can be added to the carbonatable mineral wool fibers or post-manufacturing in any suitable quantity to create an enhanced $CO_2$ adsorption surface on the carbonatable mineral wool fibers surface.

The foregoing materials that have high surface areas and/or high porosity and are used as delivery vehicles for placing $CO_2$ on the surface of or in close proximity to the carbonatable mineral wool fibers surface are preferably combined with the carbonatable mineral wool fibers in amounts of approximately 0.01% to approximately 40% by weight, more preferably approximately 1% to approximately 30% by weight, especially approximately 5% to approximately 20% by weight. The foregoing ranges include all of the intermediate values. The carbonatable mineral wool fiber can be combined with any one or more of the above at any temperature or pressure suitable to the process. It can be combined at ambient, sub-ambient or above ambient temperature. The elevated temperature preferably can be in the range of 30° C. to 250° C. The optional steam use is to provide heat and moisture to facilitate the binding of the $CO_2$, the carbonation accelerant and/or $CO_2$ adsorption enhancing compound or any combination thereof with the carbonatable mineral wool fibers as described above. Steam is preferably used to provide the appropriate and desired amount of moisture between approximately 4% and approximately 40%, with a temperature of approximately 50 to approximately 250° C. (the foregoing moisture and temperature range includes all of the intermediate values). It can be combined at a sub-atmospheric, atmospheric or greater than atmospheric pressure.

In another embodiment, the mineral wool fibers alone or either treated with $CO_2$ or a combination of $CO_2$ and a carbonation aid, a carbonation accelerant, a $CO_2$ adsorption or absorption enhancing compound or element or any combination thereof, can be mixed with carbon dioxide and a zeolite, such as a natural zeolite or a man-made zeolite, that has a high surface area and porosity of various nanostructures with relatively high gas adsorption properties. Due to their high porosity, zeolites have a high adsorption rate for gases, therefore $CO_2$ can be adsorbed into these material's structure. Any one of these types of zeolites can be mixed with carbon dioxide and the mineral wool fibers. Optionally, the zeolite can be combined with a carbonation aid, a $CO_2$ adsorption enhancing compound or carbonation accelerant compound or element or any combination thereof. Therefore, these $CO_2$ adsorbent materials allow a relatively high amount of carbon dioxide to be stored on the surface, or in close proximity thereto, on the surface or in close proximity of the mineral wool fiber, to further react with the uncarbonated Ca, Mg, Fe, Na, K and the like contained in the mineral wool fibers.

In a further embodiment, the mineral wool fibers can be treated, cured or mixed with CO2 combined with ammonium salts, quinones, such as electrochemically-reduced quinones, or any other type of quinone, metal-organic framework compounds (MOFs), such as MIL-100(Fe), a Porous Iron Trimesate with a Hierarchical Pore Structure, cyclodextrin based MOFs, cyclic oligosaccharides that are mass-produced enzymatically from starch, porous organic polymers (POPs), covalent-organic frameworks (COFs), carboxylates, and the like. Ionic liquids (ILs) can be ground, mixed or blended with $CO_2$ then the mineral wool fibers can be sprayed or cured with the $CO_2$ compound as described hereto. Any known type of $CO_2$ adsorbent, binder or carbonation accelerant or enhancer can be used to bind $CO_2$ to the mineral wool so that a sufficient or desirable amount of $CO_2$ is placed onto, or in close proximity to the mineral wool fibers surface to react over time with the carbonatable elements contained therein. We call these elements $CO_2$ adsorption enhancers and or carbonation accelerants that serve to bind and provide additional amounts of $CO_2$ to the mineral wool fibers either on the surface thereof or in close proximity thereto so that it is present to react over time with the carbonatable elements. Alternatively, the carbonation aids and carbon sorbent microporous materials can be used to adsorb or embed $CO_2$ prior to being combined with the mineral wool fibers.

In a further disclosed embodiment, the mineral wool insulation fibers can treated or cured with $CO_2$ or a combination of $CO_2$ and a $CO_2$ adsorption or carbonation aid or carbonation enhancing compound or element or any combination thereof, can be mixed with carbon dioxide and a microporous material such as carbon nanomaterials, for example, graphite nanoplatelets (GP), carbon nanofibers (CNF), activated carbons (ACs), carbon nanotubes (CNTs) and similar carbon nanomaterials have a high surface area and porosity of various nanostructures with high gas adsorption properties. Due to high porosity these materials have a high adsorption rate of gases, and therefore $CO_2$ can be adsorbed into these materials structure. Graphene, a new class of carbon nanomaterials, is found to be economical and has novel properties similar to CNTs. Anyone of these types of carbon nanomaterials can be mixed with carbon dioxide and sprayed or mixed in with the mineral wool fiber at anyone point of the manufacturing process as described above. Optionally, the carbon microporous materials can be combined with a carbonation aid, a $CO_2$ adsorption or absorption enhancing compound or a carbonation accelerant compound or element. Therefore, these materials allow a relatively large amount of carbon dioxide to be stored on the surface of or in close proximity to the mineral wool fibers, to further react with the uncarbonated Ca, Mg, Fe, Na, K and the like contained in the mineral wool fibers.

Micro-organisms that have the capacity to produce carbonates through its metabolic activity to improve the carbonation process can also be used. In nature, a lot of bacteria are capable of precipitating calcite ($CaCO_3$) and potentially other carbonates. According to the way calcium carbonate is produced, the general used bacteria could be primarily categorized into two sorts; i.e., urease bacteria and non-urease bacteria. Various urease bacteria exist in nature, among which *Bacillus pasteurii, Bacillus aerius, Bacillus sphaericus, Sporosarcina aquimarina, Bacillus megaterium*, etc. are frequently proposed for the self-healing concrete. *Bacillus pasteurii*, a Gram-positive bacterium isolated from soil, can grow normally at temperatures ranging from 15 to 37° C. The urease activities of *Bacillus pasteurii* is outstanding, which could rapidly decompose urea in the environment into ammonium and carbonate. *Bacillus megaterium* belongs to Gram-positive bacterium. Its survival and growth temperature interval extends largely between 3 and 45° C. *B. sphaericus*, Gram-positive aerobic bacterium, forms ellipsoidal spores and is able to produce urease to hydrolyzed urea. Bacterial urease can hydrolyze urea, which will cause $CaCO_3$ precipitation and provide improved carbonation of $CO_2$ onto the surface of the mineral wool fibers. In metabolism, urease-catalyzing urea hydrolysis is secreted by urease organisms. The non-urease bacteria, *Bacillus pseudofirmus, Bacillus cohnii, Bacillus halodurans, Bacillus mucilaginous* L3, *Enterococcus faecalis, Geobacillus stearothermophilus, Bacillus subtilis*, etc., are widely studied as non-urease bacteria inducing calcium carbonate precipitation. *Bacillus subtilis* is a Gram-positive bacterium that forms oval or cylindrical spores. Numerous *Bacillus subtilis* are used in agriculture and in some medicines, therefore it is not detrimental to human health. The *Bacillus pseudofirmus* hydrolyze urea into $NH_3$ and $CO_2$ by using urease produced by themselves. For non-urease bacteria, they will transform organic acids to form calcium carbonate precipitates through their own vital activities under oxygen-containing conditions. Calcium lactate or calcium acetate are often added to nutrients that non-urease bacteria can eventually convert to calcium carbonate. Most microorganisms are intolerant to alkaline environments. The *Bacillus* pseudoadamentosa has an exceptional ability to adapt to the alkaline conditions where the surviving pH value can be up to 11.0. At 10 pH condition, the growth of *Bacillus pseudofirmus* is fast, indicating the most alkali-resistant behavior. The microporous structure of the carbonatable mineral wool fibers can provide adequate room and sustain excellent connectivity for the growth and metabolism of microorganisms.

In a further embodiment, the mineral wool fibers can be sprayed, combined or mixed with carbon dioxide, carbonic acid, ammonium salts, quinones, such as electrochemically-reduced quinones, or any other type of quinone, metal-organic framework compounds (MOFs), such as MIL-100 (Fe), a Porous Iron Trimesate with a Hierarchical Pore Structure, cyclodextrin based MOFs, cyclic oligosaccharides that are mass-produced enzymatically from starch, porous organic polymers (POPs), covalent-organic frameworks (COFs), carboxylates, and the like. Ionic liquids (ILs)

can be mixed or blended with the mineral wool fibers during or post manufacturing process. Any known type of $CO_2$ adsorbent, binder or carbonation accelerant or enhancer can be used in the mineral wool fibers manufacturing process or combined post manufacturing with the mineral wool fibers so that a sufficient or desirable amount of $CO_2$ is placed onto, or into close proximity to the mineral wool fibers surface to react with the carbonatable minerals during the manufacturing process or post manufacturing process over time.

Graphite nanoplatelets (GP), carbon nanofibers (CNF), activated carbons (ACs), carbon nanotubes (CNTs) and similar carbon nanomaterials have shown good gas adsorption properties. Due to high porosity, these materials have a high adsorption rate of gases, therefore $CO_2$ can be adsorbed into these materials structure. Graphene, as new class of carbon nanomaterials, is found to be economical and has novel properties similar to CNTs. Carbon nanomaterials impregnated with carbon dioxide would then be mixed or blended with the carbonatable mineral wool fibers having the chemical and physical properties described above. Therefore, these materials allow a relatively large amount of carbon dioxide to be stored on the surface of the carbonatable mineral wool fibers to further react with the uncarbonated Ca, Mg, Fe, Na, K and the like. We call all these types of carbon materials microporous carbon materials. Microporous carbons materials can adsorb or be embedded with carbon dioxide separately from the carbonatable mineral wool fibers manufacturing process and used as a carbon dioxide delivery vehicle to the carbonatable mineral wool fibers then mixed with the carbonatable mineral wool fibers. In other words microporous carbons materials provide an enhanced amount of carbon dioxide on the surface or close proximity of the carbonatable mineral wool fibers surface so that the carbon dioxide can react with the carbonatable elements such as one or more of the un-carbonated Ca, Mg, Na, K, Fe, and the like during the mineral wool fibers manufacturing process or over time therefore the carbon dioxide mineralize to carbonatable elements contained in the carbonatable mineral wool fibers creating carbonated minerals of various types. Alternatively, the carbonatable mineral wool fibers combined with microporous carbon materials can be exposed to carbon dioxide during or post manufacturing process at ambient or elevated temperatures, and optionally with steam, such as described in the current invention. The carbon sorbent microporous materials can be combined with $CO_2$ first and then combined with the carbonatable mineral wool fibers.

Wollastonite is a calcium silicate (inosilicate) mineral ($CaSiO_3$) that may contain small amounts of iron, magnesium, and manganese substituting for calcium. In a pure $CaSiO_3$, each component forms nearly half of the mineral by weight: 48.3% of CaO and 51.7% of $SiO_2$. In some cases, small amounts of iron (Fe), and manganese (Mn), and lesser amounts of magnesium (Mg) substitute for calcium (Ca) in the mineral formula (e.g., rhodonite). Wollastonite can form a series of solid solutions in the system $CaSiO_3$—$FeSiO_3$, or hydrothermal synthesis of phases in the system $MnSiO_3$—$CaSiO_3$. The acicular nature of the wollastonite fiber allows it to adsorb or absorb $CO_2$ on it's surface and pores. Wollastonite powder impregnated with carbon dioxide would then be mixed or blended with the carbonatable mineral wool fibers having the chemical and physical properties described above. Wollastonite fibers can adsorb or be embedded with carbon dioxide separately from the carbonatable mineral wool fibers manufacturing process and used as a carbon dioxide delivery vehicle to the carbonatable mineral wool fibers then mixed with the carbonatable mineral wool fibers. Alternatively, the carbonatable mineral wool fibers combined with wollastonite can be exposed to carbon dioxide during or post manufacturing process at ambient or elevated temperatures, and optionally with steam, such as described in the current invention.

In particular, the $CO_2$ may be injected, sprayed or otherwise combined with the mineral wool fibers as well as $CO_2$ may be combined with one or more of any of the carbonation aid, accelerants or microporous materials that may be combined with the mineral wool fibers prior to or during the mineral wool fibers being sprayed or combined with the resin binder that hold the fibers together. Optionally, the binding resin used for holding the mineral wool fibers together may be combined with $CO_2$ or with one or more of the carbonation aid, accelerants or microporous materials containing $CO_2$ and together sprayed onto or combined with the mineral wool fibers. Binder resins used to glue or hold together mineral wool fibers are known in the art and are selected from organic thermosetting adhesives such as urea-modified phenolic resin which is a commonly used product for this application. Any other type of binder can be used such as Phenol Formaldehyde based, Low Formaldehyde, Formaldehyde free resin or any other type of suitable resin binder. The aqueous binder composition is traditionally comprised of the following components: a PF resole, urea, organosilanes, silicones, ammonium sulfate, ammonia, emulsifiers, and water. PF resins are formed through condensation reactions between phenol and formaldehyde. Prior to curing, a resole is typically a mixture of methylol phenols, various oligomers, and residual free phenol and formaldehyde. Depending on the formaldehyde to phenol feed ratio, the resole mixture may contain anywhere between 5 and 15 wt % of residual free formaldehyde. On exposure to higher temperatures (e.g., >60° C.), the resole can be cured through further condensation reactions, ultimately leading to the formation of a highly crosslinked, methylene bridged polymeric network. Small additions of organosilanes can significantly increase the mechanical strength of mineral wool. This effect is generally more pronounced in binders that are wet and/or that have been aged for prolonged periods (e.g., months). Inexpensive (3-aminopropyl)triethoxysilane is the most commonly used, although many others have also been reported. The organosilane acts as a coupling agent between the mineral fibers and binder, undergoing a series of reactions ultimately resulting in covalent bond formation between glass fiber surfaces. Silicones act as a hydrophobic barrier that enhances the water-resistant properties of the mineral wool. Ammonia ensures that the binder has a basic pH, usually between 8 and 10. This pH is necessary to prevent the various oligomers that comprise the binder from precipitating. An oil-based emulsifier may be added to the binder mixture mainly to reduce the dust produced during manufacture, as well as improving the hydrophobicity of the mineral wool. Water may be added as a diluent to reduce the viscosity of the binder, improving its flow properties and processability. Ammonium sulfate acts as a latent hardening agent by causing the binder to gradually become acidic throughout the curing process. Acidic conditions improve the polymerization reaction and enable a stronger resin to be obtained. Addition of ammonium sulfate is also a means of regulating the B-stage cure time. The curing process of a PF resin can be separated into three main phases: liquid resole (A-stage), gelled resin (B-stage), and fully crosslinked resin (C-stage). The B-stage must be of a sufficient time so as to allow the binder to settle at junction points between mineral fibers before hardening, and typically takes longer at neutral pH conditions. If the B-stage is too short, it will lead to pre-curing of the binder before it reaches the junction points. If the B-stage is too long, it could result in an incomplete cure reaction. Both cases have a detrimental effect on the mechanical properties of the manufactured product. Meanwhile, alternative thermosetting adhesive binder systems have been developed which do not use formaldehyde as a raw material and can therefore be considered "formaldehyde free", as discussed further below. Formaldehyde free binder alternatives to PFU resoles for MWI can generally be separated into four main categories based on the composition of their chemical feedstocks: polycarboxylates, polyvinyl alcohol (PVA), bio-based, and epoxy resins. There are also numerous examples of binders for mineral wool where two or more of these categories have been combined in a single system. Thermosetting polycarboxylates binders are based on a macromolecular carboxylate and a low molecular weight polyol crosslinking agent. PVA is a water-soluble polymer possessing desirable physical properties such as high tensile strength, excellent dimensional stability, non-toxicity, and outstanding binding capacity. It is typically prepared via the hydrolysis of PVAc and its physical properties thus depend on the degree of esterification. Bio-based binders are based on carbohydrates coupled with low molecular weight polycarboxylic acid or anhydride cross-linking agents. The carbohydrates used are mainly starch, modified starch, or sugars. These are commonly referred to in the literature as saccharides, meaning an organic compound containing sugar(s). Inorganic metal salts, for example, aluminum or copper sulfate, have also been disclosed as alternative crosslinking agents. Water-soluble carbohydrates are preferred in order to facilitate processing and curing reactions. Native starch is insoluble, does not impart adequate water resistance, and is generally considered too viscous for use within a binder composition. Starch can be modified (e.g., via hydrolysis) through chemical or enzymatic processes to improve its properties. Such binders are also frequently extended with low molecular weight polyol additives such as glycerol, which also act as a means of controlling binder viscosity. Small amounts of esterification catalyst(s) are also typically added to the binder composition, and can include Lewis acids (e.g., silicates) and phosphorus-containing compounds (e.g., sodium hypophosphite), among others. Carbohydrate-polyamine binder compositions have faster cure times than the likes of poly (carboxylate)s or simple carbohydrate binder compositions. Non-carbohydrates binders such as comprising at least one phenol and/or quinone containing compound and at least one protein are proposed. The phenol/quinone compound is selected from a group of tannins obtained from natural sources such as oak, while the protein component is derived from animal (e.g., gelatine) or plant sources (e.g., soy protein). It is also possible to use enzymes (e.g., transglutaminase) to substitute the function of the phenol/quinone compound. Epoxides represent one of the most prolific classes of thermosetting resins in the world, however they are rarely used in this application. The practical use of such binders has largely been limited by a combination of their higher costs, low heat resistance, low stability, and the limited water solubility of the most common precursors (e.g., bisphenol a diglycidyl ether). Nevertheless, the performance to cost ratio of epoxy resins is among the best of all known thermosetting materials, and their application potential continues to increase through the use of cheap fillers and novel chemistries. Epoxide binders typically exploit ring opening reactions between cheap diglycidyl ether molecules (e.g., glycerol diglycidyl ether) and polyamine cross-linkers in the presence of imidazole-based catalysts. One or more of these types of resin binders can be combined with $CO_2$, a carbonation aid or accelerant, a carbon sorbent microporous material, containing $CO_2$ and then combined with the mineral wool fibers. The resin binder can serve as a delivery vehicle of $CO_2$ to be in contact with the surface and the pores of the mineral wool fiber containing uncarbonated elements originating from the calcium-iron-aluminosilicate mineral such as basaltic hyaloclastite such as un-carbonated Ca, Mg, Fe, Na, K and the like, that may react with $CO_2$ to create simple or complex carbonates thereby mineralizing $CO_2$.

The following examples are illustrative of selected embodiments of the present invention and are not intended to limit the scope of the invention. All percentages used herein are percent by weight unless specifically stated otherwise.

Example 1

Hyaloclastite mineral is mined from a quarry and delivered to a mineral wool manufacturing plant where it is screened or ground to a fine particle size suitable for a rockwool or mineral wool fiber insulation manufacture process. The hyaloclastite mineral chemical composition comprises approximately 45% by weight $SiO_2$, approximately 14% by weight $Al_2O_3$, approximately 13% by weight $Fe_2O_3$, approximately 15% by weight CaO and approximately 7% by weight MgO. The hyaloclastite amorphous composition is approximately 70% with the balance being 30% micro-crystalline. The mineral feed is preheated and then fed into a melting furnace typical for the rockwool or mineral wool fiber insulation manufacture. The furnace is fired to a temperature of approximately 1250 to 1650° C. and the blended composition is kept in the furnace for a period of time sufficient to melt the mineral feed. After this point, the standard fiberization and/or spinning process is followed to produce the mineral wool. More particularly, the molten composition is transported to a rotating disk or "spinner" which consists of a flywheel containing thousands of micrometer sized holes. This spinner is composed of high-grade metal alloys and typically rotates at a rate of several thousand revolutions per minute (rpm). As the molten minerals move into the spinner they are drawn through these holes and fiberizing takes place. Upon exiting the flywheel, with the assistance of a downward airflow, the minerals cool and solidify, forming long, fine fibers which combine to produce a "wool". It is at this point in the process that a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placed into plastic bags in preparation for transportation to be delivered to an end user.

Example 2

Hyaloclastite mineral is mined from a quarry and delivered to a mineral wool manufacturing plant where it is screened or ground to a fine particle size suitable for a rockwool or mineral wool fiber insulation manufacture process. The hyaloclastite mineral chemical composition comprises approximately 48% by weight $SiO_2$, approximately 12% by weight $Al_2O_3$, approximately 12% by weight $Fe_2O_3$, approximately 9% by weight CaO and approximately 7% by weight MgO. The hyaloclastite is approximately 60% amorphous composition with the balance being 40% micro-crystalline. Minor constituents such as limestone, aluminum oxide and olivine sand are ground to a particle size similar to the screened or ground hyaloclastite. The ground limestone, aluminum oxide, olivine sand and calcium-iron-aluminosilicate mineral are blended together, in the approximate ratios suitable for the mineral wool manufacturing process of approximately 85% by weight hyaloclastite, approximately 10% limestone mineral, approximately 2.5% aluminum oxide and approximately 2.5% olivine sand. The blended mineral feed composition is preheated and then fed into a melting furnace typical for the rockwool or mineral wool fiber insulation manufacture. The furnace is fired to a temperature of approximately 1250 to 1650° C. and the blended composition is kept in the furnace for a period of time sufficient to melt the mineral feed. After this point, the standard fiberization and/or spinning process is followed to produce the mineral wool. More particularly, the molten composition is transported to a rotating disk or "spinner" which consists of a flywheel containing thousands of micrometer sized holes. This spinner is composed of high-grade metal alloys and typically rotates at a rate of several thousand revolutions per minute (rpm). As the molten minerals move into the spinner they are drawn through these holes and fiberizing takes place. Upon exiting the flywheel, with the assistance of a downward airflow, the minerals cool and solidify, forming long, fine fibers which combine to produce a "wool". It is at this point in the process that a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placed into plastic bags in preparation for transportation to be delivered to an end user.

Example 3

Hyaloclastite mineral is mined from a quarry and delivered to a mineral wool manufacturing plant where it is screened or ground to a fine particle size suitable for a rockwool or mineral wool fiber insulation manufacture process. The hyaloclastite chemical composition comprises approximately 46% by weight $SiO_2$, approximately 13% by weight $Al_2O_3$, approximately 13% by weight $Fe_2O_3$, approximately 10% by weight CaO and approximately 8% by weight MgO. The hyaloclastite is approximately 50% amorphous composition with the balance being 50% micro-crystalline. Minor constituents such as dolomite and bauxite are ground to a particle size similar to the screened or ground hyaloclastite. The ground dolomite, bauxite and calcium-iron-aluminosilicate mineral are blended together, in the approximate ratios suitable for the mineral wool manufacturing process of approximately 80% by weight hyaloclastite, approximately 15% dolomite mineral and approximately 5% bauxite. The blended mineral feed composition is preheated and then fed into a melting furnace typical for the rockwool or mineral wool fiber insulation manufacture. The furnace is fired to a temperature of approximately 1250 to 1650° C. and the blended composition is kept in the furnace for a period of time sufficient to melt the same. After this point the standard fiberization and/or spinning process is followed to produce the mineral wool. The molten composition is then transported to a rotating disk or "spinner" which consists of a flywheel containing thousands of micrometer sized holes. This spinner is composed of high-grade metal alloys and typically rotates at a rate of several thousand revolutions per minute (rpm). As the molten minerals move into the spinner they are drawn through these holes and fiberizing takes place. Upon exiting the flywheel, with the assistance of a downward airflow, the minerals cool and solidify, forming long, fine fibers which combine to produce a "wool". It is at this point in the process that a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 4

Hyaloclastite mineral is mined from a quarry and delivered to a mineral wool manufacturing plant where it is screened or ground to a fine particle size suitable for a rockwool or mineral wool fiber insulation manufacture process. The hyaloclastite mineral chemical composition comprises approximately 47% by weight $SiO_2$, approximately 11% by weight $Al_2O_3$, approximately 13% by weight $Fe_2O_3$, approximately 9% by weight CaO and approximately 12% by weight MgO. The hyaloclastite is approximately 40% amorphous composition with the balance being 60% micro-crystalline. Minor constituents such as dolomite, blast furnace steel slag and bauxite are ground to a particle size similar to the screened or ground hyaloclastite. The ground dolomite, blast furnace steel slag, bauxite and hyaloclastite minerals are blended together, in the approximate ratios suitable for the mineral wool manufacturing process of approximately 70% by weight hyaloclastite, approximately 15% by weight blast furnace steel slag, approximately 7% dolomite mineral and 8% bauxite. The blended mineral feed composition is preheated and then fed into the melting furnace typical for the rockwool or mineral wool fiber insulation manufacture. The furnace is fired to a temperature of approximately 1250 to 1650° C. and the blended composition is kept in the furnace for a period of time sufficient to melt the same. After this point, the standard fiberization and/or spinning process is followed to produce the mineral wool. The molten composition is transported to a rotating disk or "spinner" which consists of a flywheel containing thousands of micrometer sized holes. This spinner is composed of high-grade metal alloys and typically rotates at a rate of several thousand revolutions per minute (rpm). As the molten minerals move into the spinner they are drawn through these holes and fiberizing takes place. Upon exiting the flywheel, with the assistance of a downward airflow, the minerals cool and solidify, forming long, fine fibers which combine to produce a "wool". It is at this point in the process that a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 5

A mineral wool fiber is manufactured using the process described in Example 1 above, but modified as follows. Upon exiting the flywheel, with the assistance of a downward airflow, the minerals cool and solidify, forming long, fine fibers which combine to produce a "wool". The downward airflow contains approximately 30% carbon dioxide gas. At this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 6

A mineral wool fiber is manufactured using the process described in Example 2 above, but modified as follows. Upon exiting the flywheel, with the assistance of a downward airflow, the minerals cool and solidify, forming long, fine fibers which combine to produce a "wool". The downward airflow contains approximately 50% carbon dioxide gas. At this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 7

A mineral wool fiber is manufactured using the process described in Example 3 above, but modified as follows. Upon exiting the flywheel, with the assistance of a downward airflow, the minerals cool and solidify, forming long, fine fibers which combine to produce a "wool". The downward airflow contains approximately 70% carbon dioxide gas. At this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 8

A mineral wool fiber is manufactured using the process described in Example 4 above, but modified as follows. Upon exiting the flywheel, with the assistance of a downward airflow, the minerals cool and solidify, forming long, fine fibers which combine to produce a "wool". The downward airflow contains approximately 90% carbon dioxide gas. At this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 9

A mineral wool fiber is manufactured using the process described in Example 1 above, but modified as follows.

Upon exiting the flywheel, with the assistance of a downward airflow, the minerals cool and solidify, forming long, fine fibers which combine to produce a "wool". At this point in the process carbonic acid is applied to the fibers via spraying. After this point in the process a resin binder mixture is applied via spraying. The binder mixture, containing a thermosetting adhesive, settles at the junction points of the mineral fibers due to physical forces such as surface tension and gravity. Optionally, the resin binder can be combined with the carbonic acid and applied via spraying. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 10

A mineral wool fiber is manufactured using the process described in Example 2 above, but modified as follows. Upon exiting the flywheel, with the assistance of a downward airflow, the minerals cool and solidify, forming long, fine fibers which combine to produce a "wool". At this point in the process, carbonic acid is applied to the fibers via spraying. After this point in the process a resin binder mixture is applied via spraying. The binder mixture, containing a thermosetting adhesive, settles at the junction points of the mineral fibers due to physical forces such as surface tension and gravity. Optionally, the resin binder can be combined with the carbonic acid and applied via spraying. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 11

A mineral wool fiber is manufactured using the process described in Example 3 above, but modified as follows. Upon exiting the flywheel, with the assistance of a downward airflow, the minerals cool and solidify, forming long, fine fibers which combine to produce a "wool". At this point in the process carbonic acid is applied to the fibers via spraying. After this point in the process a resin binder mixture is applied via spraying. The binder mixture, containing a thermosetting adhesive, settles at the junction points of the mineral fibers due to physical forces such as surface tension and gravity. Optionally, the resin binder can be combined with the carbonic acid and applied via spraying. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 12

A mineral wool fiber is manufactured using the process described in Example 4 above, but modified as follows. Upon exiting the flywheel, with the assistance of a downward airflow, the minerals cool and solidify, forming long, fine fibers which combine to produce a "wool". At this point in the process carbonic acid is applied to the fibers via spraying. After this point in the process a resin binder mixture is applied via spraying. The binder mixture, containing a thermosetting adhesive, settles at the junction points of the mineral fibers due to physical forces such as surface tension and gravity. Optionally, the resin binder can be combined with the carbonic acid and applied via spraying. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 13

A mineral wool fiber is manufactured using the process described in Example 1 above, but modified as follows. Upon exiting the flywheel, with the assistance of a downward airflow, the minerals cool and solidify, forming long, fine fibers which combine to produce a "wool". At this point in the process, one or more of the carbonation aids selected from the Table 4 below and having $CO_2$ bound thereto is applied to the fibers.

TABLE 4

| Example No. | Carbonation Aid |
|---|---|
| 4a | monoethanolamine |
| 4b | diglycolamine |
| 4c | triethylenetetramine |
| 4d | tetraethylenepentamine |
| 4e | diisopropanolamine |
| 4f | diethanolamine |
| 4g | ethylene glycol |
| 4h | diethylene glycol |
| 4i | aminoethylethanolamine |
| 4j | diethylenetriamine hydroxyethyl |
| 4k | phenol |

After this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 14

A mineral wool fiber is manufactured using the process described in Example 2 above, modified as follows. Upon exiting the flywheel, with the assistance of a downward airflow, the minerals cool and solidify, forming long, fine fibers which combine to produce a "wool". At this point in the process, a one or more of the carbonation aids selected from the Table 4 above and having $CO_2$ bound thereto is applied to the fibers. After this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 15

A mineral wool fiber is manufactured using the process described in Example 3 above, but modified as follows. Upon exiting the flywheel, with the assistance of a downward airflow, the minerals cool and solidify, forming long, fine fibers which combine to produce a "wool". At this point in the process, one or more of the carbonation aids selected from the Table 4 above and having $CO_2$ bound thereto is applied to the fibers. After this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 16

A mineral wool fiber is manufactured using the hyaloclastite and process described in Example 4 above, but modified as follows. Upon exiting the flywheel, with the assistance of a downward airflow, the minerals cool and solidify, forming long, fine fibers which combine to produce a "wool". At this point in the process, one or more of the carbonation aids selected from the Table 4 above and having $CO_2$ bound thereto is applied to the fibers. After this point in the process the binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 17

A mineral wool fiber is manufactured using the process described in Example 1 above, but modified as follows. Upon exiting the flywheel, with the assistance of a downward airflow, the minerals cool and solidify, forming long, fine fibers which combine to produce a "wool". At this point in the process, one or more of the microporous materials selected from the Table 5 below and having $CO_2$ bound thereto is applied to the fibers.

TABLE 5

| Example No. | Microporous Material |
|---|---|
| 5a | graphite nanoplatelets (GP) |
| 5b | carbon nanofibers (CNF) |
| 5c | activated carbons (ACs) |
| 5d | carbon nanotubes (CNTs) |
| 5e | graphene |
| 5f | quinones |
| 5g | organic framework compounds |
| 5h | porous organic polymers |
| 5i | covalent-organic frameworks |
| 5j | zeolites |
| 5k | carboxylates |
| 5l | polymeric brushes |
| 5m | ionic liquids |
| 5n | wollastonite |

After this point in the process a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 18

A mineral wool fiber is manufactured using the process described in Example 2 above, but modified as follows. Upon exiting the flywheel, with the assistance of a downward airflow, the minerals cool and solidify, forming long, fine fibers which combine to produce a "wool". At this point in the process, one or more of the microporous materials selected from Table 5 above and having $CO_2$ bound thereto is applied to the fibers. After this point in the process, a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 19

A mineral wool fiber is manufactured using the process described in Example 3 above, but modified as follows. Upon exiting the flywheel, with the assistance of a downward airflow, the minerals cool and solidify, forming long, fine fibers which combine to produce a "wool". At this point in the process, one or more of the microporous materials selected from Table 5 above and having $CO_2$ bound thereto is applied to the fibers. After this point in the process, a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 20

A mineral wool fiber is manufactured using the process described in Example 4 above, but modified as follows. Upon exiting the flywheel, with the assistance of a downward airflow, the minerals cool and solidify, forming long, fine fibers which combine to produce a "wool". At this point in the process, one or more of the microporous materials selected from Table 5 above and having $CO_2$ bound thereto is applied to the fibers. After this point in the process, a resin binder mixture is applied via spraying. The binder mixture, containing a thermosetting adhesive, settles at the junction points of the mineral fibers due to physical forces such as surface tension and gravity. The sprayed mineral wool is then transported into a collecting chamber where water evaporation is accelerated at ≈80° C. before it is moved into curing ovens, allowing the binder to cure at temperatures of 150-250° C. The cured binder adheres the mineral fibers together, thereby providing the mineral wool with its characteristic mechanical properties such as compressive, tensile and bending strengths. The material is then removed from the ovens and subsequently cut into a desired shape. The final step in the production process involves packing the material into either rolls, mats or batts and optionally placing them into plastic bags in preparation for transportation to be delivered to an end user.

Example 21

A mineral wool fiber is manufactured using the process described in Example 1 above, but modified as follows. The final step in the production process involves packing the material into either rolls, mats or batts and placing them into plastic bags in preparation for transportation to be delivered to an end user. After the mineral wool fibers are placed into a plastic bag, carbon dioxide gas is injected in the center of the mineral wool pack inside the bag and sealed shut and stored for 21 days prior to shipping to an end user. The gas inside the bag has a concentration of approximately 30% $CO_2$.

Example 22

A mineral wool fiber is manufactured using the process described in Example 2 above, but modified as follows. The final step in the production process involves packing the material into either rolls, mats or batts and placing them into plastic bags in preparation for transportation to be delivered to an end user. After the mineral wool fibers are placed into a plastic bag, carbon dioxide gas is injected in the center of the mineral wool pack inside the bag and sealed shut and stored for 21 days prior to shipping to an end user. The gas inside the bag has a concentration of approximately 50% $CO_2$.

Example 23

A mineral wool fiber is manufactured using the hyaloclastite and process described in Example 3 above, but modified as follows. The final step in the production process involves packing the material into either rolls, mats or batts in and placing them into plastic bags in preparation for transportation to be delivered to an end user. After the mineral wool fibers are placed into a plastic bag, carbon dioxide gas is injected in the center of the mineral wool pack inside the bag and sealed shut and stored for 21 days prior to shipping to an end user. The gas inside the bag has a concentration of approximately 70% $CO_2$.

Example 24

A mineral wool fiber is manufactured using the process described in Example 4 above, but modified as follows. The final step in the production process involves packing the material into either rolls, mats or batts in and placing them into plastic bags in preparation for transportation to be delivered to an end user. After the mineral wool fibers are placed into a plastic bag, carbon dioxide gas is injected in the center of the mineral wool pack inside the bag and sealed shut and stored for 21 days prior to shipping to an end user. The gas inside the bag has a concentration of approximately 90% $CO_2$.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising:

heating a solid feedstock comprising basaltic hyaloclastite or intermediate basaltic hyaloclastite to its melting point to form a fluid melt, wherein the basaltic hyaloclastite or intermediate basaltic hyaloclastite is approximately 20% to 100% by weight amorphous; and extruding the fluid melt to form a plurality of discontinuous fibers comprising one or more of un-carbonated Ca, Mg, Na, K or Fe.

2. The method of claim 1 further comprising combining the basaltic hyaloclastite or intermediate basaltic hyaloclastite with limestone, aluminum oxide, olivine, blast furnace steel slag, dolomite or bauxite or combinations or mixtures thereof.

3. The method of claim 2, wherein the fluid melt is extruded by spinning.

4. The method of claim 3 further comprising cooling the plurality of fibers to solidify the fibers.

5. The method of claim 1, wherein the fluid melt is extruded by spinning.

6. The method of claim 5 further comprising cooling the plurality of fibers to solidify the fibers.

7. The method of claim 1, wherein the basaltic hyaloclastite or intermediate basaltic hyaloclastite has an amorphous content of approximately 40% to 100% by weight.

8. The method of claim 1, wherein the basaltic hyaloclastite or intermediate basaltic hyaloclastite has an amorphous content of approximately 60% to 100% by weight.

9. The method of claim 1 further comprising exposing the fibers to carbon dioxide in gaseous, liquid or solid form, wherein when in gaseous form the carbon dioxide gas is at a concentration greater than its atmospheric concentration.

10. A method comprising:

heating hyaloclastite to its melting point to form a fluid melt, wherein the hyaloclastite comprises one or more of uncarbonated CaO, MgO, $Na_2O$, $K_2O$ or FeO;

extruding the fluid melt to form a plurality of fibers; and combining the plurality of fibers with a carbonation aid, wherein the carbonation aid facilitates the conversion of one or more of CaO, MgO, $Na_2O$, $K_2O$ or FeO to a carbonate or a $CO_3$ containing mineral in the presence of $CO_2$, wherein one or more of the carbonation aid or the hyaloclastite has carbon dioxide bound thereto at a concentration greater than its atmospheric concentration.

11. The method of claim 10, wherein the carbonation aid is an amine, an ammonium salt, a metal-oxide framework, an enzyme, an amino acid, a quinone, an ionic liquid, a porous organic polymer, a covalent-organic framework or combinations or mixtures thereof.

12. The method of claim 10, wherein the hyaloclastite is basaltic hyaloclastite or intermediate basaltic hyaloclastite.

13. The method of claim 10, wherein the hyaloclastite has an amorphous content of approximately 20% to 100% by weight.

14. The method of claim 10, wherein the hyaloclastite has an amorphous content of approximately 60% to 100% by weight.

15. A method comprising:

heating hyaloclastite to its melting point to form a fluid melt, wherein the hyaloclastite comprises one or more of un-carbonated Ca, Mg, Na, K or Fe;

extruding the fluid melt to form a plurality of fibers; and combining the plurality of fibers with a carbon dioxide sorbent microporous material, wherein one or more of the carbon dioxide sorbent microporous material and the hyaloclastite has carbon dioxide bound thereto at a concentration greater than its atmospheric concentration.

16. The method of claim 15, wherein the carbon dioxide sorbent microporous material is a metal-oxide framework, an activated microporous carbon material, a carbon nanotube, graphite, graphene, a zeolite, a porous organic polymer, a covalent-organic framework or combinations or mixtures thereof.

17. The method of claim 15, wherein the hyaloclastite is basaltic hyaloclastite or intermediate basaltic hyaloclastite.

18. The method of claim 15, wherein the hyaloclastite has an amorphous content of approximately 20% to 100% by weight.

* * * * *